March 22, 1966  J. GUERIN ETAL  3,241,911

PROCESS FOR PRODUCING SODIUM CYANIDE

Filed July 10, 1963

INVENTORS.
JEAN GUERIN
JEAN AIGUEPERSE
BY Webb, Mackey & Burden

ATTORNEYS.

3,241,911
PROCESS FOR PRODUCING SODIUM CYANIDE
Jean Guerin and Jean Aigueperse, Grenoble (Isere), France, assignors to Societe d'Electro-Chimie, d'Electro-Metallurgie et des Acieries Electriques d'Ugine, Paris, France, a corporation of France
Filed July 10, 1963, Ser. No. 294,064
Claims priority, application France, July 13, 1962, 904,023
8 Claims. (Cl. 23—79)

This invention relates to a process in which sodium cyanide is separated from a solution as sodium cyanide dihydrate, $NaCN.2H_2O$, crystals.

Until the last few years, sodium cyanide had been obtained chiefly by the Castner process, which consists in treating together sodium, ammonia and charcoal at about 650–750° C. The cyanide obtained in the molten state was cast and sold in the form of eggs or briquettes.

During the last ten years, the development of various processes for producing gaseous hydrogen cyanide effected obtention of sodium cyanide by neutralization of a sodium hydroxide solution. Several processes of this kind have been industrialized.

The most general method consists in making hydrogen cyanide react with 30–35% sodium hydroxide solutions until the free hydroxide content has been lowered to 0.3 or even 0.1%. The sodium cyanide solutions thus obtained contain 28 to 33% cyanide. Afterwards, by evaporation under reduced pressure, at relatively high temperature, anhydrous cyanide, NaCN, crystals are formed, then separated by filtering or drying. These crystals are sold as they are, or agglomerated by any known means. However, the anhydrous cyanide crystals thus obtained generally retain, after drying, 12% of water. This water contains the impurities brought along by the reagents, which impurities remain in the final product. Moreover, these crystals are very fine and, owing to the toxicity of the product, they must be agglomerated. While this agglomeration advantageously reduces hygroscopicity, it presents the inconvenience of reduced dissolution speed.

It has also been proposed to separate sodium cyanide dihydrate, $NaCN.2H_2O$, crystals. In this respect French Patent 591,441, filed January 7, 1925, disclosed treating a highly alkaline lye with gaseous hydrogen cyanide. In particular, the patent proposed to start from a concentrated alkaline lye and to carry out the operation at a temperature as high as possible, the dihydrate being separated from the solution by cooling down. The mother-liquors may be reutilized if charged again with sodium hydroxide and water so as to obtain a new starting concentrated solution.

Figure 1:
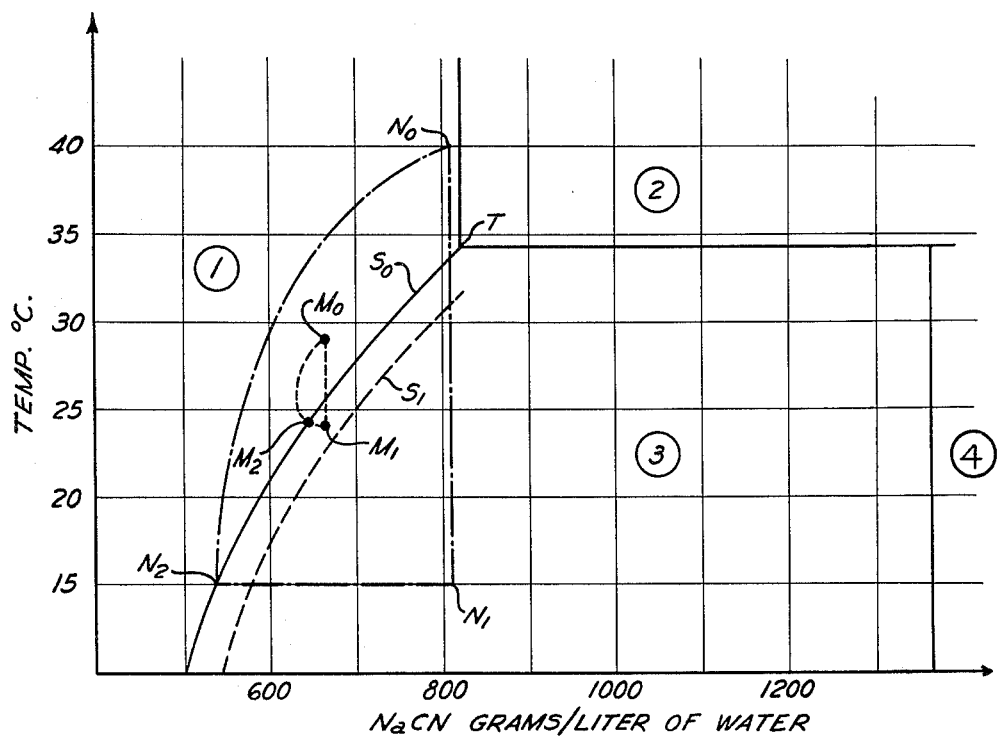

Our process is based on the following facts:

First, the diagram of sodium cyanide solubility in water, in full lines on FIGURE 1, comprises a transition point for 45% by weight of sodium cyanide (820 g. NaCN per liter of water) at a temperature of 34.7° C. Above 34.7° C., and in the suitable concentration conditions, only anhydrous cyanide can be precipitated. But below 34.7° C., the dihydrate deposits.

Second, we have observed the fact, not yet disclosed, that in the dihydrate crystallization zone, there is a wide supersaturation area of about 40 g./l., defined by curves $S_1$ and $S_0$ (FIGURE 1). Inside this area, the solution remains supersaturated without formation of seed crystals. On the other hand, below curve $S_1$ there occurs a crystallization due to the spontaneous formation of seed crystals. This observation forms one basis of the process of the invention.

According to our process, a solution containing from about 550 to less than 820 g. of sodium cyanide per liter of water is prepared by almost completely neutralizing with hydrogen cyanide sodium hydroxide added in suitable amount to an unsaturated solution of sodium cyanide. The obtained solution is cooled down to be saturated, then further cooled to form a supersaturated solution which is between saturation curve $S_0$ and supersaturation curve $S_1$. Into this supersaturated solution is introduced fine sodium cyanide dihydrate crystals which act as seeds and thus large sodium cyanide dihydrate crystals are formed. These large crystals are separated afterwards by filtering or drying.

Before the hydrogen cyanide action, the sodium hydroxide concentration of the solution ranges between 30 and 100 g./l. After neutralization, an excess of free hydroxide of 0.2 to 3% by weight is present in the solution.

In a second embodiment of carrying out the invention, the solution to be neutralized by hydrogen cyanide is formed by adding, in suitable quantity, to a desupersaturated and recycled solution, a sodium hydroxide solution with a concentration corresponding to monohydrate sodium hydroxide, $NaOH.H_2O$. Thus the amount of water brought by the sodium hydroxide solution and by the neutralizing reaction:

$$NaOH.H_2O + HCN \rightarrow NaCN.2H_2O$$

is equal to that of the water fixed by the dihydrate.

In a third embodiment of the invention, hydrogen cyanide is introduced into the alkaline solution in the liquid form. Thus, the latent vaporization heat is profitable and the industrial problems of cooling are simplified.

The process may be utilized for discontinuous working. However, we prefer to use a continuous working in which the amounts of water, sodium hydroxide and hydrogen cyanide corresponding, except for the losses, to the dihydrate extracted, are continuously added. It is preferable to simultaneously introduce sodium hydroxide as monohydrate sodium hydroxide, $NaOH.H_2O$, and hydrogen cyanide in the liquid state. In this case, all evaporation stage likely to aid decomposition into formate is avoided. The desupersaturated solution from a crystallizer must preferably be very low so as to avoid crystallizations in inconvenient places of apparatus for practicing the process. The desupersaturated solution is reheated and recharged with sodium hydroxide, then with hydrogen cyanide, in order to regenerate sodium cyanide. Thus, the production of fine crystals is avoided and filtering and drying operations are facilitated.

The amount of mother-liquors retained by the large crystals during separation is less than the amount retained during the anhydrous salt extraction and not higher than 5%. It is then possible to work with mother-liquors containing more impurities and likely to be reutilized more often. It is even possible to intentionally charge the mother-liquors with free sodium hydroxide and so reduce the risks of hydrolyzing sodium cyanide according to:

$$NaCN + H_2O \rightarrow HCN + NaOH$$

The purity of the obtained dihydrate according to the invention process is very high.

It will be easier to understand the invention by reference to:

FIGURE 1 which represents the useful portion of the diagram $NaCN-H_2O$, comprising, on the abscissa, the sodium cyanide concentration in grams per liter of water, and on the ordinate, the temperature in ° C.

Point T is the transition point.

The numbered zones correspond to the following fields:

(1) NaCN solution in water,
(2) NaCN+solution,
(3) Dihydrate+solution,
(4) Dihydrate+NaCN.

Curve $S_0$ is the saturation curve of sodium cyanide; $S_1$ is the supersaturation or spontaneous germination curve of sodium cyanide dihydrate.

Figure 2:
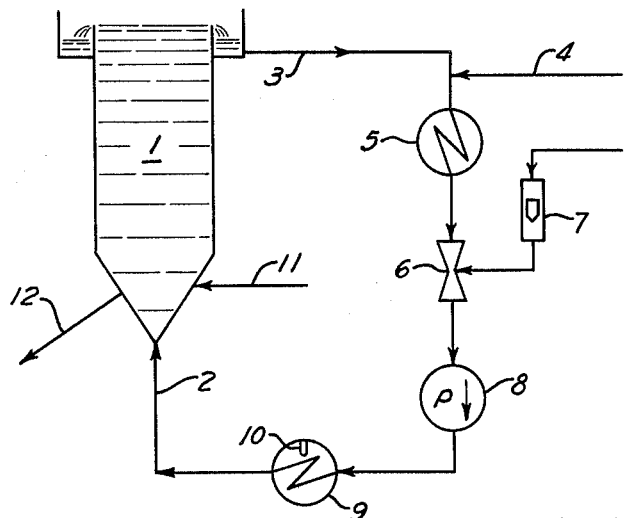

FIGURE 2 represents a schematic diagram of apparatus for continuous carrying out of the invention when hydrogen cyanide is introduced in the liquid form.

This apparatus comprises a crystallizer-decanter 1, that is a cylindrical vertical column at the power part of which the supersaturated solution arrives through pipe 2 and out of the upper part of which the impoverished de-supersaturated solution flows through pipe 3. This desupersaturated solution receives, through a feed conduit 4, a sodium hydroxide solution of concentration corresponding to monohydrate $NaOH.H_2O$ which is hot and at 70° C., since aqueous sodium hydroxide solutions of such a concentration are solid at room temperature. Afterwards, the solution presses into a cooler 5, then into an injector-ejector 6 of the Venturi type wherein it receives liquid hydrogen cyanide at a rate controlled by means of a flowmeter 7 and regulated according to the sodium hydroxide flow by a regulator (not shown).

The resulting alkaline solution is taken up by a circulation pump 8 and passes into an exchanger 9 wherein it is brought by cooling to the desired supersaturation state, the temperature regulation being assured by a thermostat 10. A supplementary solution containing fine crystals of sodium cyanide dihydrate, acting as seeds, is introduced through feed line 11 into the lower part of crystallizer-decanter 1 and the large crystals which form are extracted from the bottom of the decanter through line 12. The desupersaturated solution flows out, as already indicated, through the pipe 3. Afterwards, the crystalline slurry extracted through line 12 is dried.

On the diagram of FIGURE 1, the solution resulting from the neutralization is represented by $M_0$, the cooled supersaturated solution by $M_1$, the desupersaturated or improverished solution by $M_2$. The addition of sodium hydroxide and water, then the addition of hydrogen cyanide bring back the latter solution to $M_0$. Of course, point $M_0$ is always above curve $S_0$, and may have any concentration below the concentration corresponding to transition point T, so as to accord with the manufacturing conditions as well as possible.

It is easy to see from the description and the given examples that the above-mentioned French Patent 591,-441 delineates on the diagram of FIGURE 1 a tracing $N_0-N_1-N_2$ which is quite different from that of the present invention. According to the patent, a cyanide solution is formed at a temperature as high as possible, then strongly cooled down far beyond the supersaturation curve $S_1$, which allows the extraction of a large portion of the dissolved salt as crystals, but has no influence upon the crystal size.

*Example*

The sodium hydroxide lye introduced through pipe 2 was a solution containing 69% of NaOH at 70° C. The injection flow of this sodium hydroxide lye was 1/160 of the flow of the recycled mother-liquors. Thanks to the cooling action of the cooler 5, the solution temperature during the hydrogen cyanide introduction remained below 25° C. The flow of hydrogen cyanide introduced through the injector-ejector 6 was regulated in order that the obtained solution might contain an NaOH excess at least equal to 0.2% by weight. In practice, this excess was maintained around 3%.

In the exchanger 9, the solution was cooled 5° C. below the temperature it had reached after the hydrogen cyanide introduction. This supersaturated solution was introduced into the crystallizer-decanter 1 wherein it rose slowly. The fine crystals introduced into the lower part of the decanter 1 were first slowly dragged upwards and become larger as they agglomerated at the expense of the cyanide in excess. When they had reached a sufficient volume, they began going down and were collected at the bottom of the apparatus.

The crystals thus drawn off were formed of agglomerated superposed flakes, having each a size between 3 and 10 mm. and an average thickness of 1 mm. Afterwards, these crystals were dried and then they contained 98% of sodium cyanide.

While we have shown and described a preferred embodiment of our invention, it may be otherwise embodied within the scope of the appended claims.

We claim:

1. A process for production of sodium cyanide dihydrate comprising forming a solution of sodium cyanide which contains from about 550 to less than 820 grams of sodium cyanide per liter of water by adding to an unsaturated solution of sodium cyanide, sodium hydroxide in an amount such that the sodium hydroxide content of said solution is between about 30 and about 100 g./l. substantially completely neutralizing said solution with hydrogen cyanide in an amount such that after neutralization said solution has an excess of free hydroxide in an amount of about 0.2 to 3 percent by weight, said solution being at a temperature at which it is unsaturated with sodium cyanide, cooling said solution down to a temperature which is above that temperature at which occurs a spontaneous formation of seed crystals of sodium cyanide dihydrate and which is below that temperature at which said solution is a saturated solution of aqueous sodium cyanide to form a supersaturated solution of sodium cyanide, adding to said supersaturated solution seed crystals of sodium cyanide dihydrate to form large crystals of sodium cyanide dihydrate, separating said large crystals from a desupersaturated solution which results from formation of said large crystals.

2. A continuous process for production of sodium cyanide dihydrate comprising forming a solution of sodium cyanide which contains from about 550 to less than 820 grams of sodium cyanide per liter of water by adding to an unsaturated solution of sodium cyanide, sodium hydroxide in an amount such that the sodium hydroxide content of said solution is between about 30 and about 100 g./l., substantially completely neutralizing said solution with hydrogen cyanide in an amount such that after neutralization said solution has an excess of free hydroxide in an amount of about 0.2 to 3 percent by weight, said solution being at a temperature at which it is unsaturated with sodium cyanide, cooling said solution down to a temperature which is above that temperature at which occurs a spontaneous formation of seed crystals of sodium cyanide dihydrate and which is below that temperature at which said solution is a saturated solution of aqueous sodium cyanide to form a supersaturated solution of sodium cyanide, adding to said supersaturated solution seed crystals of sodium cyanide dihydrate to form large crystals of sodium cyanide dihydrate, recovering said large crystals and thereby forming a desupersaturated solution, heating said desupersaturated solution to a temperature at which same is unsaturated with sodium cyanide to form a recycling solution, adding to said heated recycling solution sodium hydroxide, hydrogen cyanide and water in amounts to substantially replace said removed sodium cyanide dihydrate and repeating said cooling, adding of seed crystals and separating steps.

3. The process of claim 1 characterized by introducing said hydrogen cyanide as a liquid.

4. The process of claim 1 characterized by said large crystals being agglomerated superposed flakes, each having a size between 3 and 10 mm. and an average thickness of 1 mm., drying said crystals to obtain sodium cyanide of 98% purity.

5. The process of claim 2 characterized by adding said hydrogen cyanide as a liquid.

6. The process of claim 2 characterized by adding said water and sodium hydroxide to said recycling solution as sodium hydroxide monohydrate.

7. The process of claim 2 characterized by adding said water and said sodium hydroxide to said recycling solution as sodium hydroxide monohydrate and simultaneously therewith adding said hydrogen cyanide.

8. The process of claim 2 characterized by said large crystals being agglomerated superposed flakes, each having a size between 3 and 10 mm. and an average thickness of 1 mm., drying said crystals to obtain sodium cyanide of 98% purity.

References Cited by the Examiner

UNITED STATES PATENTS

| | | | |
|---|---|---|---|
| 2,365,417 | 12/1944 | Kusman | 23—79 |
| 2,708,151 | 5/1955 | McMinn | 23—79 |
| 2,773,752 | 12/1956 | Kremer et al. | 23—84 X |

FOREIGN PATENTS

| | | |
|---|---|---|
| 719,436 | 4/1942 | Germany. |
| 26,581 | of 1908 | Great Britain. |
| 487,606 | 6/1938 | Great Britain. |

BENJAMIN HENKIN, *Primary Examiner.*

MAURICE A. BRINDISI, *Examiner.*